Dec. 23, 1941.  R. MATTEUCCI  2,266,784
MEANS CONTROLLING PROPELLER PITCH AND SPEED OF PROPELLING ENGINE
Filed April 26, 1939  4 Sheets-Sheet 1
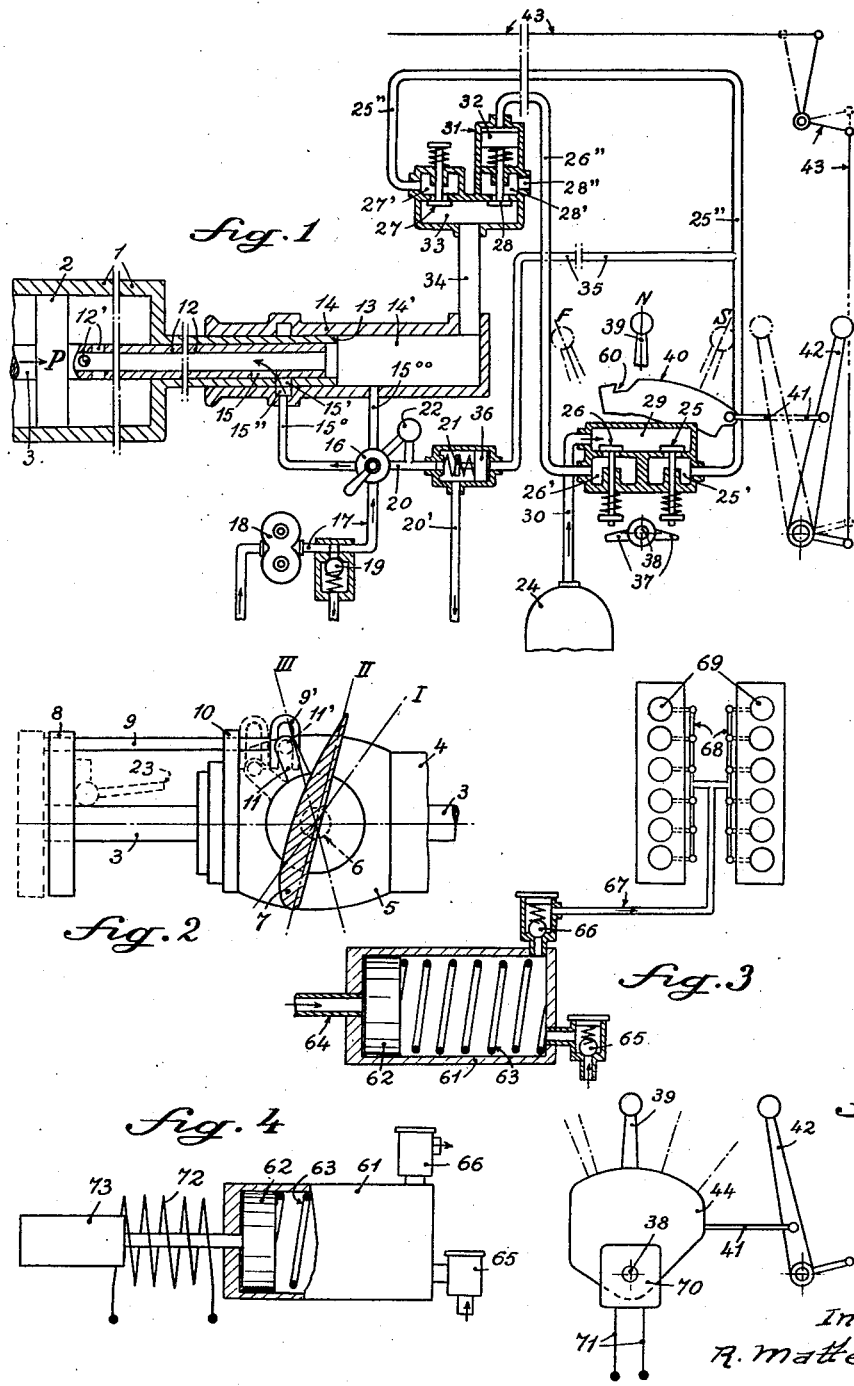
Inventor,
R. Matteucci
By: Glascock Downing & Seebold
Attys.

Dec. 23, 1941.   R. MATTEUCCI   2,266,784
MEANS CONTROLLING PROPELLER PITCH AND SPEED OF PROPELLING ENGINE
Filed April 26, 1939   4 Sheets-Sheet 2
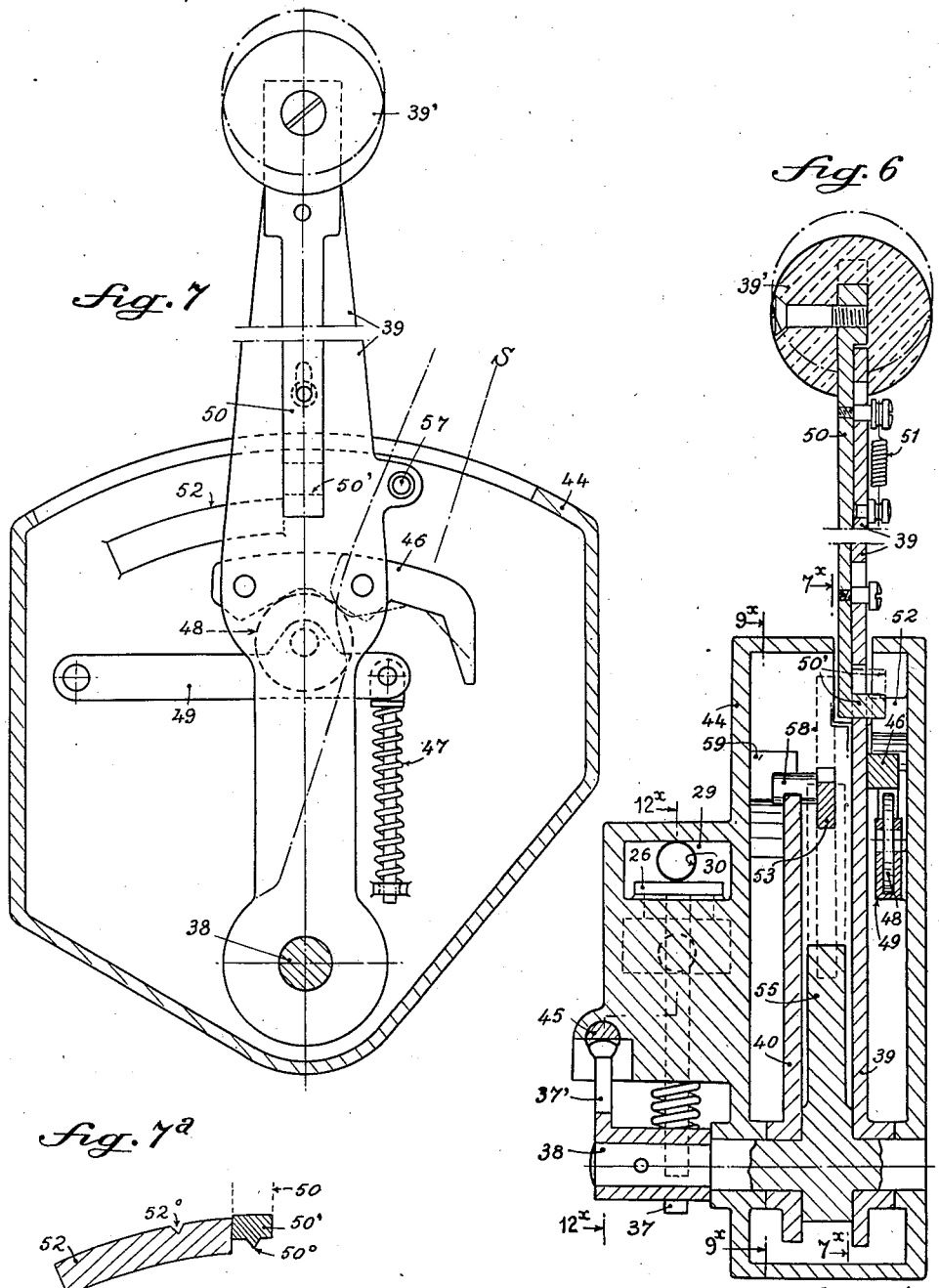
Inventor,
R. Matteucci
By: Glascock Downing & Seebold
Attys.

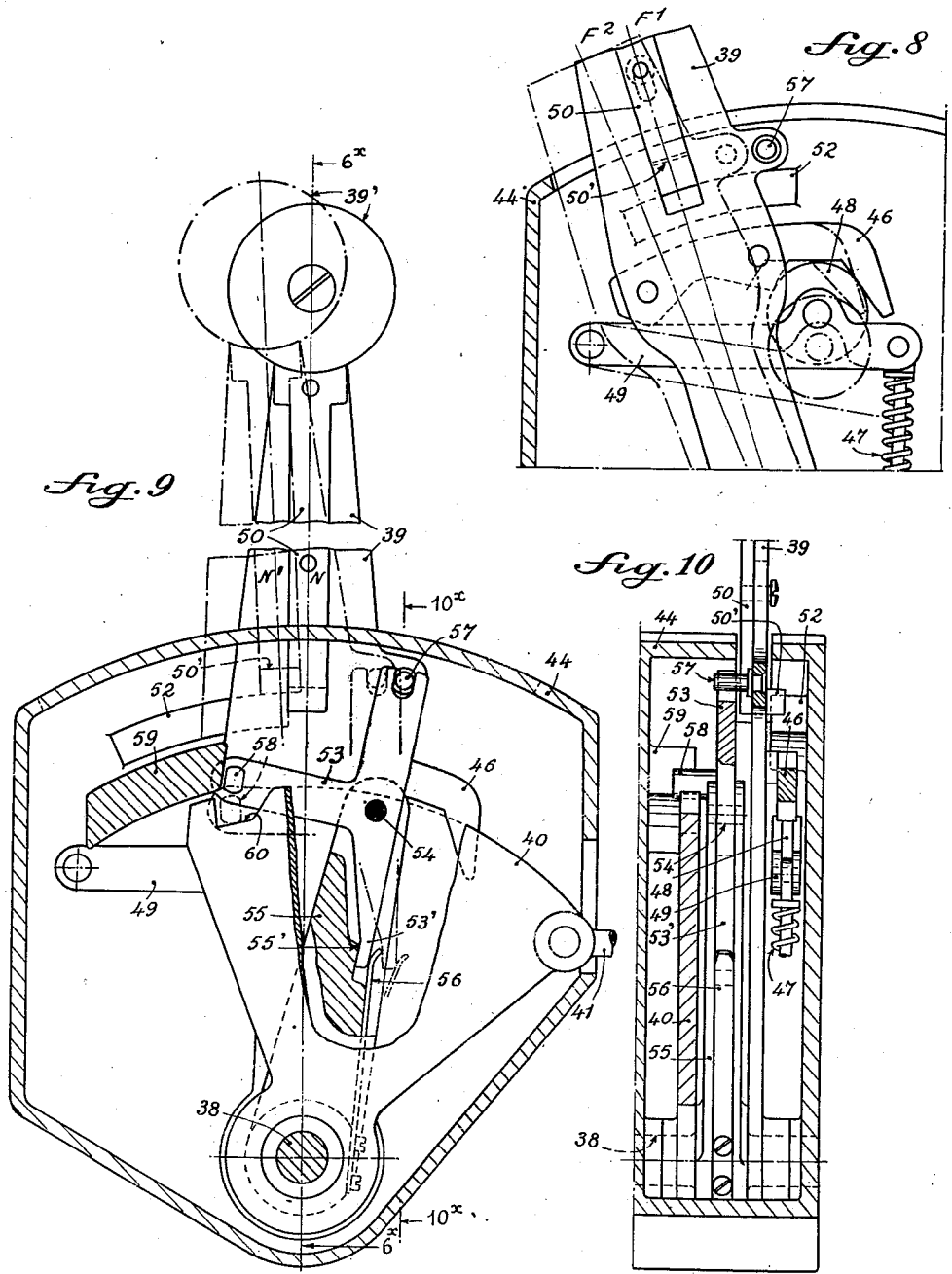

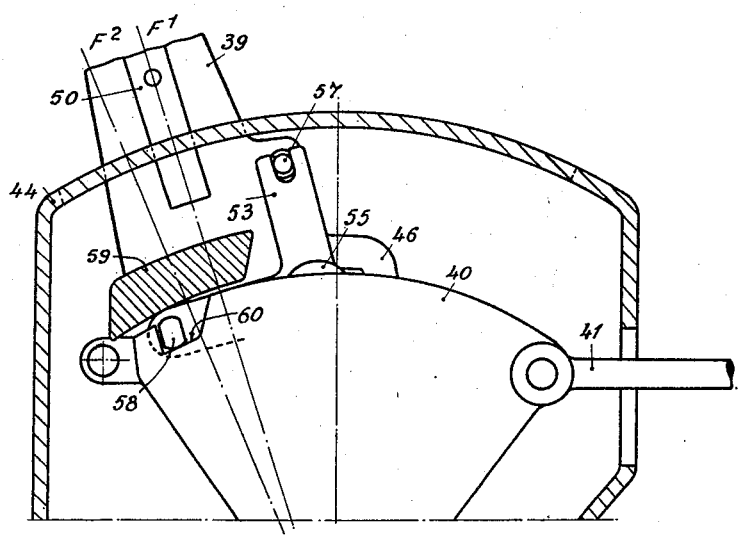
Fig. 11
Fig. 12
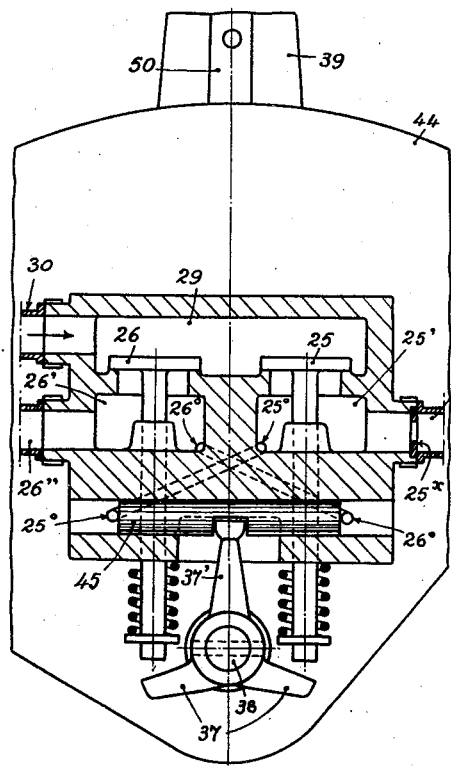
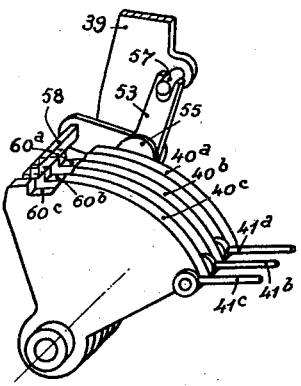
Fig. 13
Inventor,
R. Matteucci

Patented Dec. 23, 1941

2,266,784

UNITED STATES PATENT OFFICE 2,266,784

MEANS CONTROLLING PROPELLER PITCH AND SPEED OF PROPELLING ENGINE

Raffaele Matteucci, Turin, Italy

Application April 26, 1939, Serial No. 270,264
In Italy May 7, 1938

9 Claims. (Cl. 170—135.6)

The present invention pertains to apparatus for varying the pitch of propellers and means for automatically controlling the speed of the engine driving the propeller during changes in the propeller pitch.

It is known that, in aircraft driven by propellers with pitch variable during flight, aerodynamic braking is effected, through suitable means of control, by reversing the pitch of the propellers. Safety requires that this braking be done at the moment the pilot may judge most opportune and when conditions favour its success, amongst which conditions is that the maneuver of braking be commenced only when the engine or engines are running at the minimum, or somewhere near the minimum speed. It is also indispensable that in the interval between the commencement of the maneuver and the reversal of the pitch, the engine be immediately accelerated. It is further necessary that during braking the member actuating the fuel feed to the engine be under the control of the means actuating the brake. Lastly it is necessary that during debraking the member actuating the fuel feed to the engine be first of all brought back to the slow running position and then released for free manipulation.

The present invention relates to a device for controlling the aerodynamic braking which, differently from known devices, answers all the aforesaid safety requirements in such a manner as to exclude any wrong or untimely maneuver. The invention includes, safety devices capable of being removed only by a particular movement on the part of the pilot. The invention includes locking means which act automatically according to the position of the members controlling the fuel feed to the engine and means for engagement of the controlling member of the brake with the members controlling the fuel feed to the engine, which allow of such engagement only after the locking means have been automatically released. The control arrangement is preferably completed by means intended to effect a sure and rapid acceleration of the engine during the interval between the commencement of the braking maneuver and the reversal of the pitch.

The device for actuating the aerodynamic braking will be hereinafter described, with reference to the annexed drawings, in its application to a propeller the variations of the pitch of which are effected by means of fluids under pressure, such as that referred to in my application Ser. No. 160,170. This has, however, no limiting nature inasmuch as such device can be fitted no matter what may be the means of effecting the variations in the pitch of the propeller.

In the drawings:

Fig. 1 is a diagrammatic view showing means controlling the distribution of fluids under pressure for varying the pitch of the propeller blades.

Fig. 2 is a plan view of the mechanism for actuating the blades.

Fig. 3 is a sectional view of means for moving additional fuel to the engine.

Fig. 4 is an elevational view partly in section of modified means for accelerating the engine.

Fig. 5 is a diagrammatic view of control means for the engine when the variations in pitch are obtained by electrical means.

Fig. 6 is a vertical sectional view of the brake control mechanism taken on the line 6X—6X of Fig. 9.

Fig. 7 is a sectional elevation taken on the line 7X—7X of Fig. 6.

Fig. 7a is a sectional view of a modified latch for the control lever.

Fig. 8 is a part sectional view similar to Fig. 7 with the control lever in a different position.

Fig. 9 is a sectional view taken on the line 9X—9X of Fig. 6.

Fig. 10 is a sectional view of the control mechanism taken on the line 10X—10X of Fig. 9.

Fig. 11 is a sectional view similar to Fig. 9 showing the parts in another position.

Fig. 12 is a sectional view taken on the line 12X—12X of Fig. 6.

Fig. 13 is a perspective view of the quadrant members for controlling the speed of the engine or engines.

In known propellers, where the variation of the pitch is carried out by means of fluids under pressure, such fluids operate in a cylinder 1 participating in general in the rotary motion of the propeller, a piston 2 mounted in the cylinder drives a rod 3, forming the actuating member of the blades, which slides in a hollow shaft 4 on which is mounted the hub 5 of the propeller carrying radial pins 6 on which the blades 7 are pivoted as shown in Fig. 2. The end of the rod 3 carries a cross-head 8 on which are mounted as many rods 9 as there are blades. Each rod 9 slides in a suitable guide 10 and with its forked end 9' engages on the pin 11' of a radial projection 11 of the root of the blade. The reciprocating motion of the rod 3 is thus transformed into a rotating movement of the blades 7 on their pivots 6.

To the piston 2 is fixed a hollow cylindrical slide valve 12 movable in the sleeve 13 formed by an extension of the cylinder 1 and fitting tightly in a fixed support 14 in the form of a chamber 14' which, through the ports 12' of the slide valve, communicates with the interior of the cylinder 1. In the slide valve and in the sleeve is provided at least one pair of co-operating ports 15 and 15', while in the fixed support, in correspondence with the port 15', is provided a feed groove 15" for the fluid under pressure brought here by the pipe 15° leading from the controller 16. The delivery pipe 17 of the feed pump 18, on which is fitted the suitably adjusted safety valve 19, leads to the controller 16 from which leads the discharge pipes 20 and 20' in which is inserted the stop valve 21. Between the controller 16 and the discharge pipe 20 is inserted another safety valve 22 adjusted for a lower pressure than that of the valve 19.

When the controller 16 interrupts the flow of oil from the pipe 17 to the pipe 15° and puts the cylinder 1 in communication with the discharge pipe 20' through the pipe 15°°, the piston 2 together with its rod 3, under the action of a return force P, moves towards the right in Fig. 1 until a removable stop 23, carried on the crosshead 8, engages the hub 5. The blades 7 take up the position I which corresponds to a normal propelling pitch. Upon feeding oil under pressure to the groove 15" of the support 14, by means of the controller 16 and through the ports 15' and 15, the piston 2 takes up another position when, through the throttling between the ports 15' and 15, the rate of feed becomes equal to the losses from the system through the inevitable leakages due to faulty tightness of several parts. The blades then assume the position II or short pitch. Other intermediate positions between I and II can be effected by adopting several pairs of ports similar to 15 and 15'.

For the reversal of the pitch, that is, in order to bring the blades into position III, in this kind of propeller another fluid under pressure is used, preferably compressed air, contained in a bottle 24 and distributed by known means comprising, for example, a pair of main valves 25 and 26 and a pair of auxiliary valves 27 and 28. To the common chamber 29, upstream side of the valves 25 and 26, comes, through a pipe 30, the air from the bottle 24 and from the separate chambers 25' and 26', on the downstream side of these valves, lead the pipes 25" and 26". The pipe 25" leads into the chamber 27' upstream from the valve 27, while the pipe 26" leads into the cylinder 31 of the piston 32 of which controls the valve 28. The single chamber 28' upstream of the valve 28 is provided with a free discharge opening 28", and the common chamber 33 on the downstream side of the two valves 27 and 28 communicates with the chamber 14' through a tube 34. The valve 25, in combination with the valve 27, directly controls the admission of the compressed air to the chamber 14'. The valve 26, with the intermediary of the piston 32 and the valve 28, controls indirectly the discharge of the compressed air from the chamber 14'. From the pipe 25" branches off the pipe 35 which leads to the cylinder of the stop valve 21 which is closed by a piston 36 shutting off the discharge of oil through the controller 16, when the compressed air is fed to the cylinder 1.

The valves 25 and 26 are actuated by a rocking lever 37 secured to a shaft 38 adapted to be actuated by the brake lever 39, not directly as in known control arrangements, but indirectly, when the automatic locking means permit of it, through engagement parts which act also on a quadrant 40 mounted loosely on the shaft 38 and connected by the tie-rod 41 to the hand lever 42 which, through means of a transmission arrangement 43, controls the speed of the engine by opening or closing the carbureters or the fuel feeding devices.

The control device according to the present invention as shown in Figs. 6 to 12 comprises a casing 44 in which is mounted, free to turn, the shaft 38 and on which is mounted the set of valves 25 and 26 completed by a slide valve 45 actuated by a third arm 37' of the rocking lever for controlling the two passages 25° and 26°, independent of each other, which lead from the chambers 25' and 26' to the atmosphere. In the neutral position (N) of the brake lever 39, both these passages are open to the atmosphere in order to discharge the compressed air from the pipes 25" and 26" so as to allow the pistons 32 and 36 to return to the rest position. In the braking position (F) or the debraking position (S) of the brake lever, the passage 25° or 26° which correspond respectively to the chamber of the valve 25 or 26 alternately actuated by the rocking lever 37, is closed.

The brake lever 39 is mounted loose on the shaft 38 and is held in the three positions by a catch comprising a toothed cam 46, in which, under the action of elastic means 47, engages a roller 48 borne by the oscillating lever 49. In Fig. 7 the brake lever 39 is shown in full lines in the position N and in Fig. 8 this lever is shown in full lines in the normal braking position $F^1$, and in dotted lines in the emergency braking position $F^2$, into which it can be temporarily placed by forcing the retaining means. The lever 39, although always free to move from position N to position S and vice versa, is normally locked in its movement from N towards F by a safety latch 50 connected to the handle 39' of the lever 39 mounted so as to slide along the lever and drawn downwards by elastic means 51 to engage with its tooth 50' against the head of an arched stop 52 fixed to the side of the casing 44. In order to bring the lever 39 into the braking position it is therefore necessary to remove this locking device by drawing the handle 39' upwards, an operation which can not be performed inadvertently, but only intentionally by the pilot. On drawing up the handle 39', the tooth 50' is also raised and is then free to move along the arched piece 52 during the movement of the lever from N to F and vice versa.

The brake lever 39 is linked to the shaft 38 by an intermediate connection consisting of a bell crank lever 53 articulated at 54 to the end of a radial arm 55 connected to the shaft 38, which lever is held in the rest position against a stop 55' of the arm 55 by a spring 56 acting on the tail 53' of the lever 53. The arm of the bell crank lever 53, substantially in line with the radial arm 55, is in engagement with a pin 57 carried by the brake lever 39; the other arm of 53 carries a cross bar 58 which normally abuts against the head of another arched stop 59 integral with a side of the casing 44, thus locking the lever against any movement from N towards F. The quadrant 40, mounted loose on the shaft 38 and linked by the tie-rod 41 to the hand lever 42 of the carburetters or fuel pumps, has on its periphery a driving notch 60 which comes under the bar 58 when the hand lever 42 is in the position to which corresponds the minimum engine speed. Under these conditions, if the locking latch 50' is raised and the lever is forced from the neutral position towards the braking position, the bar 58 slides down along the head of the part 59 and while the lever 39 moves from the position N to the position N' as shown in Fig. 9 the bar 58 engages in the notch 60 and the quadrant 40 is carried along with the movement of the control lever 39 which thus takes up the exclusive control of the members which regulate the running speed of the engine. This engagement lasts throughout the stroke of the control lever from the neutral to the braking position, and vice versa, because the bar 58, sliding underneath the arched flank of the projection 59 is held in engagement with the notch 60 as shown in Fig. 11.

When there are several engines, there are as many quadrants $40^a$, $40^b$, $40^c$ ..., as there are engines, mounted on the shaft 38, as is shown in the perspective detail of Fig. 13, which are controlled simultaneously by the cross-bar 58 of the lever 53.

When the engine is of the type operated by the explosion of a carburetted mixture, the above described controlling device is preferably completed by an injector in the inlet manifold in order to facilitate a rapid pick-up of the engine speed at the commencement of the braking action. This injector as shown in Fig. 3 comprises a cylinder 61 in which a piston 62 is forced to the left by a spring 63 and towards the right by the action of compressed air which is admitted through the pipe 64 adapted to be connected at any point to the pipe 25''. During the stroke to the left the piston sucks fuel through the valve 65; during the stroke to the right the fuel sucked in is injected, through the valve 66 and the pipes 67 and 68, into the intake manifold of the cylinders 69 of the engine, at a point near the inlet valves.

In order to effect braking it is first of all necessary to bring the means regulating the running speed of the engine to the position corresponding to the slow running speed. The notch 60 of each quadrant 40 then finds itself in the position shown in Fig. 9. The handle 39' of the lever 39 is then raised and the lever can then be moved from the position N to the position N' whereby the bar 58 engages into a notch 60 and takes up the control of the quadrant 40. Continuing the movement of the lever 39 towards the braking position, there comes a moment in which the right arm of the rocking lever 37 abuts against the stem of the valve 25 as shown in Fig. 12. An appreciable resistance is then felt to the opening of the valve 25 both by the action of its spring and by the air pressure acting upon it. The position reached by the lever 39, perfectly identifiable by the resistance felt to further movement, may be called the "ready for braking position" in which the quadrant 40 is somewhat out of position and the carburetters slightly opened so that the engines now run at a greater speed than the minimum. In this position the passage $25^\circ$ is already closed. To effect braking the control lever 39 is pushed into the position $F^1$. The rocking lever 37 lifts the valve 25 and the compressed air is admitted through the valve 27 to the cylinder I and produces the reversal of the pitch. The compressed air, acting on the piston 36, then closes the stop valve 21 which shuts off the oil discharge from the cylinder I. Simultaneously the fuel injector 61 is actuated, and as the quadrant 40 has in the meantime operated the gas hand lever 42, the engine has a rapid pick-up and the normal aerodynamic braking is thus effected. If it is desired to effect a still more energetic braking, the lever 39 is forced to the position $F^2$ thus further moving the hand lever 42 and bringing the output of the engine to a still higher power. It should be noted here that in order to somewhat retard the action of the compressed air so that the reversal of the propeller pitch takes place after the engine has begun to accelerate, a diaphragm $25^x$ is preferably fitted, with a suitably calibrated opening, in the pipe 25'' as shown in Fig. 12.

To arrest the braking action the brake lever 39 is moved in the opposite direction, that is, towards the debraking position S. In passing, during this movement, through the neutral position N, the latch 50 again springs into the locking position and the bar 58 leaves the drag notch 60 of the quadrant 40. The members controlling the speed of the engines are thus left in exactly the same position they were in before taking up control and the lever 42 becomes free once more for manual manipulation. When the lever 39 passes through the position N, the slide valve 45 uncovers the passage $25^\circ$ so that the stop valve 21 is opened. When the lever 39 reaches the position S, the slide valve 45 has already closed the passage $26^\circ$ and the rocking lever 37 opens the valve 26. The compressed air now acts on the piston 32 which opens the valve 28. The air which had previously acted in the cylinder I is discharged through the opening 28'' and the propeller blades, under the influence of the force P, return to the normal propulsion pitch. Upon bringing the lever 39 back to the neutral position N, the valves 26 and 28 are again closed and the oil feeding is re-established in the cylinder I in the manner determined by the position in which the handle of the controller 16 happens to be, whereby the blades again take up the propulsion pitch to which such position corresponds. Then by bringing the brake lever 39 from the position S to the position N the propeller pitch is varied between the long or normal propulsion pitch to any other shorter pitch defined by the position of the controller 16, and such movements of the lever 39 can sometimes be used with advantage in place of those of the controller 16 to varying the propulsion pitch between the above mentioned two values.

According to the constructional variation illustrated in Fig. $7^a$ the tooth 50' of the safety latch of the brake lever 39 is furnished with a smaller tooth $50^\circ$ which, during the braking maneuver, slides along the curved surface of the fixed stop 52 which has a notch $52^\circ$ situated in such a position that if the small tooth $50^\circ$ enters it, the handle 42 is then in a semi-open position and the engine develops less power than that chosen for normal braking. With the lever 39 in the position $F^1$ or $F^2$, if it is then moved a little towards N and is stopped in the position in which the small tooth $50^\circ$ engages in the notch $52^\circ$, the speed of the engine or engines decreases and a moderate braking action is set up which can be brought to ordinary or emergency force by simply moving the lever 39 back to position $F^1$ or $F^2$. This moderate braking effect can be used advantageously during flight, for instance, just before landing.

It should be noted here that, with a controlling device according to the present invention, once the brake lever 39 is placed in the debraking position S, free control of the members regulating the engine speed can be immediately resumed without having to first bring the lever 39 to the position N. This is of considerable advantage in cases where it may be necessary to resume flight hurriedly.

It is obvious that the controlling device in accordance with the present invention is also applicable to propellers in which the variations and the reversal of pitch are effected by other means than a fluid under pressure. Thus, in the case of electrically controlled propellers, the shaft 38 of the controlling device may serve to actuate a contact apparatus 70 as shown in Fig. 5 from which branch off the wires 71 which lead to the electrical controlling parts of the propeller blades. In such a case the fuel injector for the engine pickup will be controlled, as is indicated schematically in Fig. 4, by a solenoid 72 acting on a magnetic core 73 mounted on the rod of the piston 62 or by other suitable mechanism.

The controlling device is also applicable to those propellers in which the pitch variations are effected by means of gearing which receive their motion from the propeller shaft itself. In such cases the shaft 38 actuates the mechanism which sets the said gears in motion.

I claim:

1. In apparatus for varying the pitch of propeller blades and controlling the speed of a propelling engine, a shaft, a double armed lever secured to said shaft, means adapted to be engaged by one arm of said lever for turning the propeller blades in one direction, means adapted to be engaged by the other arm of said lever for turning the propeller blades in a reversed direction, a manually operable lever mounted for free movement on said shaft, a notched quadrant member on said shaft, a bell-crank lever moved by said manually operable lever, a cross-bar carried by the bell-crank lever, engine control means connected to said quadrant member, and means for forcing said cross-bar into the notch of the quadrant member when the manually operable lever is moved in one direction to move said quadrant member so as to change the speed of the engine and move an arm of the double armed lever into engagement with the pitch changing means.

2. In apparatus for varying the pitch of a propeller blade and controlling the speed of the propeller engine, a shaft, an arm secured to said shaft, means adapted to be engaged by said arm for turning the propeller blade to a braking position, a manually operable lever rotatably mounted on said shaft, a notched quadrant member on said shaft, a bell-crank lever moved by said manually operable lever, a cross-bar carried by the bell-crank lever, engine control means connected to said quadrant member, and means for forcing said cross-bar into the notch of said quadrant member before said arm engages the means for turning the blade to a braking position.

3. In apparatus for varying the pitch of a propeller blade and controlling the speed of the propeller engine, a shaft, an arm secured to said shaft, means adapted to be engaged by said arm for turning the propeller blade to a braking position, a manually operable lever rotatably mounted on said shaft, a notched quadrant member on said shaft, a bell-crank lever pivotally mounted to be moved by said manually operable lever, a cross-bar carried by the bell-crank lever, engine control means connected to said quadrant member, an arched stop member arranged adjacent said cross bar for moving the cross-bar into the notch of the quadrant member after the manually operable lever has been moved a predetermined distance.

4. In apparatus for varying the pitch of propeller blades and controlling the speed of a propeller engine, a shaft, a double armed lever secured to said shaft, means adapted to be engaged by one arm of said lever for turning the propeller blades in one direction, means adapted to be engaged by the other arm of said lever for turning the propeller blades in a reversed direction, a manually operable lever mounted for free movement on said shaft, a notched quadrant member on said shaft, a radial arm on said shaft, a bell-crank lever pivotable on said radial arm engaged by said manually operable lever, a cross-bar carried by the bell-crank lever, engine speed control means connected to said quadrant member, and means for forcing said cross-bar into the notch of the quadrant member when the means controlling the speed of the engine has first been moved to a slow running position and the manually operable lever is moved in one direction to move said quadrant member so as to increase the speed of the engine and move an arm of the double armed lever into engagement with the pitch changing means.

5. In apparatus for varying the pitch of propeller blades and controlling the speed of the propeller engine, a shaft, an arm secured to said shaft, means adapted to be engaged by said arm for turning the propeller blades to a braking position, a manually operable lever rotatably mounted on said shaft, a notched quadrant member on said shaft, a radial arm on said shaft, a bell-crank lever pivotable on said radial arm engaged by said manually operable lever, a cross-bar carried by the bell-crank lever, engine control means connected to said quadrant member, and means for forcing said cross-bar into the notch of said quadrant member when the means controlling the speed of the engine has first been moved to a slow running position and before said arm engages the means for turning the blades to a braking position.

6. In apparatus for varying the pitch of propeller blades and controlling the speed of the propeller engine, a shaft, an arm secured to said shaft, means adapted to be engaged by said arm for turning the propeller blades to a braking position, a manually operable lever rotatably mounted on said shaft, a notched quadrant member on said shaft, a radial arm on said shaft, a bell-crank lever pivotable on said radial arm engaged by said manually operable lever, a cross-bar carried by the bell-crank lever, engine control means connected to said quadrant member, an arched stop member arranged adjacent said cross-bar for moving the cross-bar into the notch of the quadrant member when the means controlling the speed of the engine has been moved to a slow running position and after the manually operable lever has been moved a predetermined distance.

7. In apparatus for varying the pitch of propeller blades and controlling the speed of the propelling engine, a shaft, an arm secured to the shaft, means adapted to be engaged by said arm for turning the propeller blades to a braking position, a manually operable lever mounted for free swinging movement on said shaft, a quadrant member mounted for free swinging movement on said shaft, a radial arm carried by said shaft, a bell-crank lever pivotally mounted on said radial arm and moved by the manually operable lever, a bar carried by the bell-crank lever, engine speed control means connected to said quadrant member, an arched member, a releasable latch carried by said manually operable lever engaging said arched member, and means for moving the bar into driving engagement with the quadrant member when the manually operable lever is moved toward a position for effecting engagement of the first arm with the means for turning the propeller blades to the braking position.

8. In apparatus for varying the pitch of propeller blades and controlling the speed of the propelling engine, a shaft, an arm secured to the shaft, means adapted to be engaged by said arm for turning the propeller blades to a braking position, a manually operable lever mounted for free swinging movement on said shaft, a quadrant member mounted for free swinging movement on said shaft, a radial arm carried by said shaft, a bell-crank lever pivotally mounted on said radial arm and moved by the manually operable lever, a bar carried by the bell-crank lever, engine speed control means connected to said quadrant member, an arched member having a notch therein, a latch movably mounted on said manually operable lever engaging an end of said arched member, a tooth carried by said latch for engaging the notch of said arch member when the manually operable lever is free to swing along the arched member, and means moving the bar into driving engagement with the quadrant member when the manually operable lever is moved towards the braking position.

9. In apparatus for varying the pitch of propeller blades and controlling the speed of the propelling engine, a cylinder, a piston movable in the cylinder for controlling the orientation of the blades, a source of fluid medium under pressure for moving the piston in one direction, means for moving the piston in another direction, a shaft, a manually operable lever mounted for free swinging movement on said shaft, a radial arm carried by said shaft, a bell-crank lever pivotable on said radial arm and engaged by said manually operable lever, a three armed lever secured to said shaft, a pipe including means adapted to be engaged by one of said three arms for controlling the inlet of the fluid medium to the cylinder and thereby turning the propeller blades in one direction, a pipe including means adapted to be engaged by another of the three arms for controlling the discharge of the fluid medium and thereby turning the propeller blades in a reversed direction, a slide valve adapted to be engaged by the third arm of said lever for placing the pipes in communication with the atmosphere when the manually operable lever is in a neutral position and for excluding said communication with respect to one of said pipes when the manually operable lever is moved to an extreme position.

RAFFAELE MATTEUCCI.